(12) United States Patent
Arriaga et al.

(10) Patent No.: US 11,682,249 B1
(45) Date of Patent: Jun. 20, 2023

(54) ACCESSING SMART HOME DEVICES USING A FINGERPRINT SENSOR ON A DOORBELL DEVICE

(71) Applicant: Ademco Inc., Golden Valley, MN (US)

(72) Inventors: José Miguel Díaz Arriaga, Chihuahua (MX); Rodolfo Piña Ramírez, Chihuahua (MX); César Rodríguez Esqueda, Chihuahua (MX); Edgar Abraham González Romero, Chihuahua (MX); José Luis García Hernández, Chihuahua (MX)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 17/547,604

(22) Filed: Dec. 10, 2021

(51) Int. Cl.
| | |
|---|---|
| *G07C 9/00* | (2020.01) |
| *G06V 40/12* | (2022.01) |
| *G06V 40/13* | (2022.01) |
| *G08B 13/22* | (2006.01) |
| *H04N 7/18* | (2006.01) |
| *G06V 40/50* | (2022.01) |

(52) U.S. Cl.
CPC ..... *G07C 9/00563* (2013.01); *G06V 40/1306* (2022.01); *G06V 40/1318* (2022.01); *G06V 40/1365* (2022.01); *G06V 40/50* (2022.01); *G08B 13/22* (2013.01); *H04N 7/188* (2013.01)

(58) Field of Classification Search
CPC ........... G07C 9/00563; G06V 40/1306; G06V 40/1318; G06V 40/1365; G06V 40/50; G08B 13/22; H04N 7/188
See application file for complete search history.

(56) References Cited

U.S. PATENT DOCUMENTS

| | | | |
|---|---|---|---|
| 6,100,811 A | 8/2000 | Hsu et al. | |
| 9,208,676 B2 | 12/2015 | Fadell et al. | |
| 10,361,878 B1 | 7/2019 | Loreille | |
| 10,832,509 B1 | 11/2020 | Read et al. | |
| 2007/0008078 A1* | 1/2007 | Sau | G07C 9/38 |
| | | | 340/330 |
| 2007/0014443 A1* | 1/2007 | Russo | G06V 40/1388 |
| | | | 382/124 |
| 2018/0012463 A1 | 1/2018 | Chaudhry et al. | |
| 2019/0347916 A1* | 11/2019 | Wild | H04L 67/1095 |
| 2020/0002977 A1 | 1/2020 | Russi-Vigoya | |
| 2020/0012844 A1* | 1/2020 | Kim | G06V 40/1365 |

(Continued)

OTHER PUBLICATIONS

International Patent Application No. PCT/US2022/081171, International Search Report and Written Opinion, dated Mar. 28, 2023, 15 pages.

*Primary Examiner* — Jonathan A Boyd
(74) *Attorney, Agent, or Firm* — Fredrikson & Byron, P.A.

(57) ABSTRACT

This disclosure includes techniques for controlling smart home devices upon entering a home with a fingerprint sensor in a doorbell device. After capturing a fingerprint of a digit of a guest and sending the fingerprint to a server device, the server device matches the fingerprint of the digit to an entry in a guest fingerprint database for a first user. The server device sends an operational command to a smart home device separate from the doorbell device and located at a same premises as the doorbell device. In response to receiving the operational command from the server device, the smart home device performs an action corresponding to the operational command.

16 Claims, 4 Drawing Sheets

(56) References Cited

U.S. PATENT DOCUMENTS

2020/0267354 A1    8/2020   Siminoff
2020/0286313 A1    9/2020   Scalisi
2021/0407240 A1*  12/2021   Jaber ...................... G06F 21/32

* cited by examiner

ACCESSING SMART HOME DEVICES USING A FINGERPRINT SENSOR ON A DOORBELL DEVICE

TECHNICAL FIELD

The disclosure relates to smart home appliances.

BACKGROUND

To date, smart home devices are typically only controlled by a select few household members that are given explicit control of an entire system by an owner of the system. When users wish to grant guests access to their smart home devices, they typically are relegated to sharing secure information without putting adequate limitations on the access. For instance, if a user wishes to grant control of their computerized lock to a guest, they typically have to give their secure PIN to the guest. When the user wishes to revoke access, they are generally forced to change the PIN itself, disrupting the process for every trusted user.

SUMMARY

In general, the disclosure is directed to a system for controlling smart home devices in a building using a fingerprint sensor located at an entrance to the building, such as a doorbell device. The fingerprint sensor can capture a representation of a fingerprint for a particular person. A trusted operator of the device can install a particular set of rules on the device for the guest with that fingerprint to control certain smart home devices in certain ways when that fingerprint is scanned. For instance, the rules can include actions such as unlock a computerized locking mechanism on the front door, set a thermostat to a particular temperature for heating or cooling of the home, turn on a particular playlist of music to play over a smart speaker in the home, turn on a smart television to a particular channel or streaming application, or control lights in the home, among other things. The doorbell device sends the representation of the fingerprint to the server device for verification whenever the guest arrives, and the server device will, in turn, send the command stored in the database to the smart home device, either directly via the same network that the server device received the representation of the fingerprint or, in an instance of the case of the smart home device being from a third-party manufacturer, potentially through a third-party cloud server run by the third-party manufacturer.

Using the techniques described herein, a homeowner or trusted user of a smart home ecosystem can securely and simply grant immediate and limited access to a variety of smart home devices in a manner explicitly customized by the trusted user. With trusted guests, such as family members or close friends, the user can adjust various devices within the home to operate in accordance with the trusted guests' preferred manner, providing quick and consistent comfort and efficiency to those trusted users whenever they wish to enter the home. With less casual guests who require access to the home, such as cleaning crews or dogwalkers, the user can customize the setup to unlock the door, potentially turn on preferred playlists of music for when they are conducting business with the home, and possibly turning on security cameras within the home to monitor their presence.

Furthermore, when the user wishes for that guest to no longer have that access, the user can remove or edit the entry for that guest without disrupting every other user and/or guest who accesses the home. For instance, if the user's dogwalker finds different employment and the user needs to find a new dogwalker, the user can revoke access from the previous dogwalker and add access to the new dogwalker, editing only their experience without requiring security changes to every other guest. Furthermore, the separation of processes between the doorbell, the server, and the smart home device creates added stability, security, and consistency with the more trusted infrastructure over the network which those devices communicate.

In one example, the disclosure is directed to a system comprising a computerized locking mechanism in a locked state. The system further comprises a server device comprising one or more processors. The system also comprises a doorbell device separate from the computerized locking mechanism, the doorbell device comprising a fingerprint sensor. The doorbell device is configured to detect, using the fingerprint sensor, a touch input from a first digit of a first guest. The doorbell device is further configured to capture, using the fingerprint sensor, a representation of a fingerprint of the first digit of the first guest. The doorbell device is also configured to, in response to capturing the representation of the fingerprint of the first digit, transmit the representation of the fingerprint of the first digit to the server device. The one or more processors of the server device are configured to, in response to receiving the representation of the fingerprint of the first digit, compare the representation of the fingerprint of the first digit to one or more entries of a guest fingerprint database for a first user, wherein a profile of the first user includes an association with the doorbell device. The one or more processors of the server device are further configured to, in response to determining that the representation of the fingerprint of the first digit substantially matches a first entry of the guest fingerprint database for the first user, send an unlock command to the computerized locking mechanism. The computerized locking mechanism is configured to, in response to receiving the unlock command from the server device, change to an unlocked state.

In another example, the disclosure is directed to a method including detecting, by fingerprint sensor of a doorbell device, a touch input from a first digit of a first guest. The method further includes capturing, by the fingerprint sensor, a representation of a fingerprint of the first digit of the first guest. The method also includes, in response to capturing the representation of the fingerprint of the first digit, transmitting, by the doorbell device, the representation of the fingerprint of the first digit to a server device. The method further includes, in response to receiving the representation of the fingerprint of the first digit, comparing, by the server device, the representation of the fingerprint of the first digit to one or more entries of a guest fingerprint database for a first user, wherein a profile of the first user includes an association with the doorbell device. The method also includes, in response to determining that representation of the fingerprint of the first digit substantially matches a first entry of the guest fingerprint database for the first user, sending an operational command to a smart home device separate from the doorbell device and located at a same premises as the doorbell device. The method further includes, in response to receiving the operational command from the server device, performing, by the smart home device, an action corresponding to the operational command.

In another example, the disclosure is directed to a non-transitory computer-readable storage medium containing instructions. The instructions, when executed, cause one or more processors to receive, from a doorbell device comprising a fingerprint sensor, a representation of a fingerprint of a first digit of a first guest. The instructions further cause the one or more processors to, in response to receiving the representation of the fingerprint of the first digit, compare the representation of the fingerprint of the first digit to one or more entries of a guest fingerprint database for a first user, wherein a profile of the first user includes an association with the doorbell device. The instructions also cause the one or more processors to, in response to determining that representation of the fingerprint of the first digit substantially matches a first entry of the guest fingerprint database for the first user, send an unlock command to the computerized locking mechanism The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
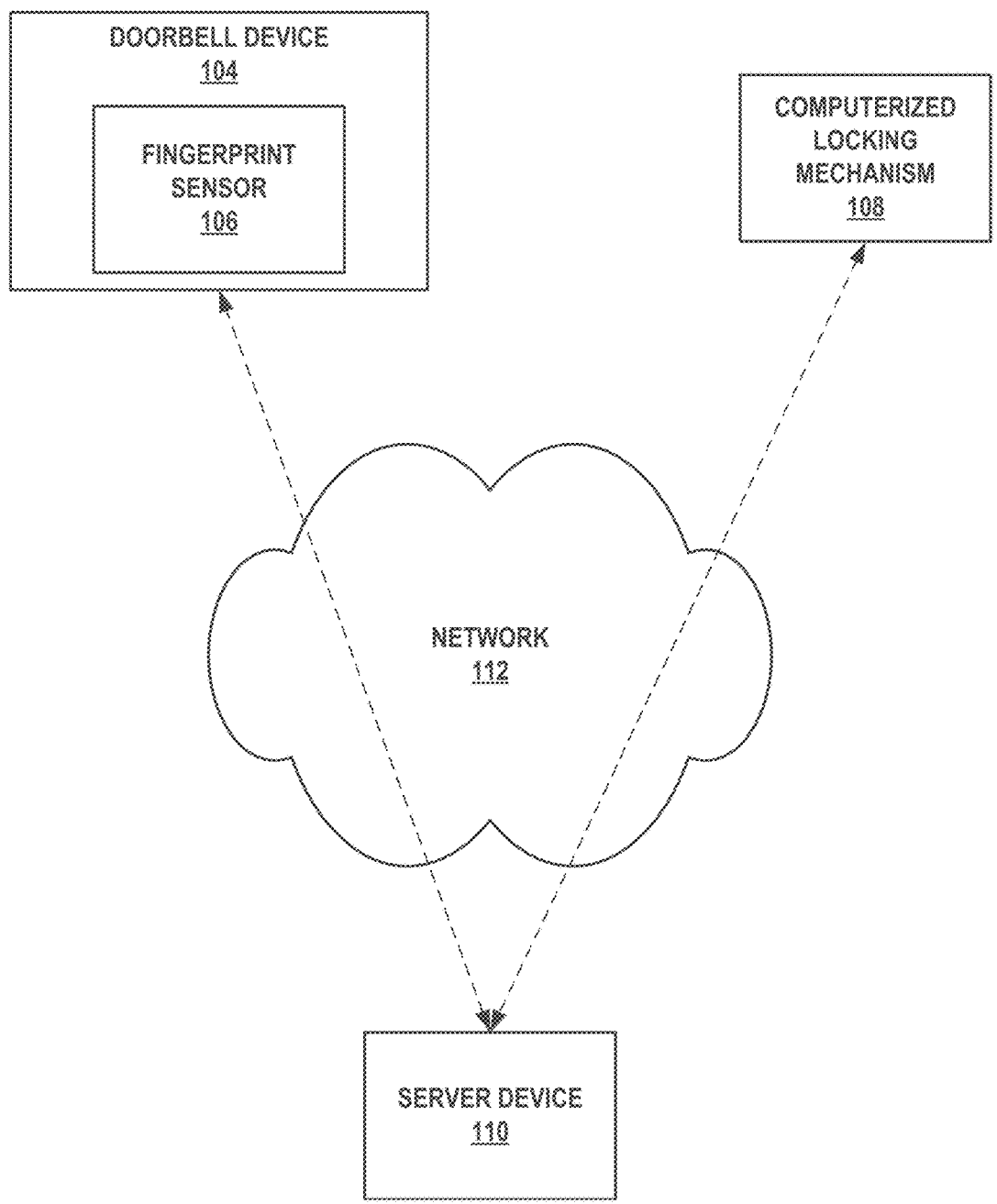
FIG. 1 is a block diagram illustrating an example system for unlocking a computerized locking mechanism using a fingerprint sensor on a doorbell device, in accordance with the techniques described herein.

FIG. 1 is a block diagram illustrating an example system 102 for unlocking computerized locking mechanism 108 using fingerprint sensor 106 on doorbell device 104, in accordance with the techniques described herein. System 102 may also include server device 110, which may communicate with both doorbell device 104 and computerized locking mechanism 108 via network 112.

Server device 110 may be any computer with the processing power required to adequately execute the techniques described herein. For instance, server device 110 may be any one or more of a mobile computing device (e.g., a smartphone, a tablet computer, a laptop computer, etc.), a desktop computer, a smart home component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

Doorbell device 104 may be any computerized doorbell device that can communicate with a server, such as server device 110, over a network, such as network 112. Doorbell device 104 may include an input device, such as a button or a touch screen, that, when activated, prompts a sound to be output in or around a building on which doorbell device 104 is installed to make a dweller aware of the person's presence. Doorbell device 104 may include additional sensors not shown, such as a camera sensor and a motion sensor. Doorbell device 104 may also include fingerprint sensor 106, which may be any sensor capable of capturing a representation of a fingerprint. For instance, fingerprint sensor 106 may be an optical fingerprint sensor, a capacitive fingerprint sensor, an ultrasound fingerprint sensor, a thermal fingerprint sensor, or any other type of sensor that can capture a representation of a fingerprint.

Computerized locking mechanism 108 may be any lock capable of being installed on an entry point, such as a door or a window, that is capable of being operated electronically and can communicate with a server, such as server device 110, over a network, such as network 112.

Network 112 may be any piece of infrastructure to transmit communications from an end device to a server, such as server device 110. Network 112 may be an Internet connection, typically assisted by a modem and/or router device located at the home to receive the initial communications from the end device and transmit the communications to network 112. Network 112 may also be a different form of long- or short-distance communication network, such as a hardwired Internet or fiber optic connection, a wireless Internet or cellular connection, a radio connection, a Bluetooth® connection, a ZigBee® connection, or any other suitable connection.

Throughout this disclosure, the term "guest" will be used to describe an individual operating fingerprint sensor 106 and doorbell device 104. "Guest" may be any individual programmed to have access to the smart home ecosystem. For instance, the guest may be a user or owner of the smart home ecosystem, a family member of the user or owner of the smart home ecosystem2, a friend of the user or owner of the smart home ecosystem, an employee of the user or owner of the smart home ecosystem, or any other acquaintance, personal, business, or otherwise, of the user or owner of the smart home ecosystem. As such, a "guest" may be any individual attempting to access the smart home ecosystem or the home that contains the smart home ecosystem. In other words, while the term "guest" is used throughout this disclosure, the term may, in addition to non-users, visitors, or non-owners, refer to the user which owns or operates the smart home devices, including the user that would be notified of the attempted access.

In accordance with the techniques described herein, fingerprint sensor 106 of doorbell device 104 detects a touch input from a first digit of a first guest. Fingerprint sensor 106 captures a representation of a fingerprint of the first digit of the first guest. In response to capturing the representation of the fingerprint of the first digit, doorbell device 104 transmits the representation of the fingerprint of the first digit to a server device. In response to receiving the representation of the fingerprint of the first digit, server device 110 compares the representation of the fingerprint of the first digit to one or more entries of a guest fingerprint database for a first user, where a profile of the first user includes an association with the doorbell device. In response to determining that representation of the fingerprint of the first digit substantially matches a first entry of the guest fingerprint database for the first user, server device 110 sends an unlock command to computerized locking mechanism 108, separate from doorbell device 104 and located at a same premises as doorbell device 104. In response to receiving the operational command from the server device, computerized locking mechanism 108 changes to an unlocked state.

Figure 2:
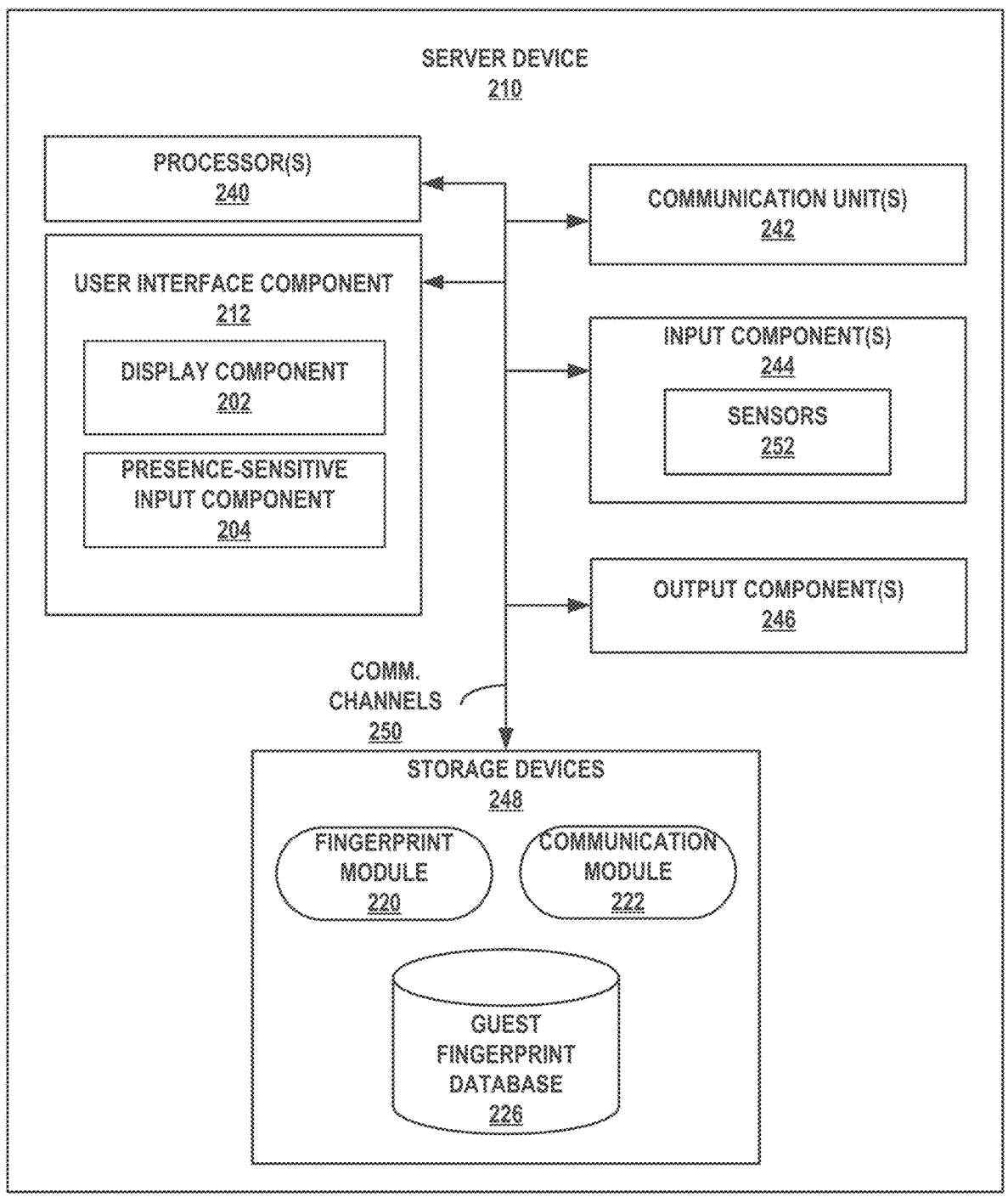
FIG. 2 is a block diagram illustrating a more detailed example of a computing device configured to perform the techniques described herein.

FIG. 2 is a block diagram illustrating an example computing device configured to analyze a received representation of a fingerprint in order to control various smart home devices, in accordance with one or more aspects of the techniques described in this disclosure. Server device 210 of FIG. 2 is described below as an example of server device 110 of FIG. 1. FIG. 2 illustrates only one particular example of server device 210, and many other examples of server device 210 may be used in other instances and may include a subset of the components included in example server device 210 or may include additional components not shown in FIG. 2.

Server device 210 may be any computer with the processing power required to adequately execute the techniques described herein. For instance, server device 210 may be any one or more of a mobile computing device (e.g., a smartphone, a tablet computer, a laptop computer, etc.), a desktop computer, a smart home component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, server device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of server device 210 include fingerprint module 220, communication module 222, and guest fingerprint database 226.

One or more processors 240 may implement functionality and/or execute instructions associated with server device 210 to analyze a received fingerprint representation and control various smart home devices. That is, processors 240 may implement functionality and/or execute instructions associated with server device 210 to receive a fingerprint representation from doorbell device 104, analyze the received fingerprint representation, and control one or more smart home devices, such as computerized lock 108 or smart speakers 322 of FIG. 3.

Examples of processors 240 include application processors, display controllers, auxiliary processors, one or more sensor hubs, and any other hardware configure to function as a processor, a processing unit, or a processing device. Modules 220 and 222 may be operable by processors 240 to perform various actions, operations, or functions of server device 210. For example, processors 240 of server device 210 may retrieve and execute instructions stored by storage components 248 that cause processors 240 to perform the operations described with respect to modules 220 and 222. The instructions, when executed by processors 240, may cause server device 210 to receive a fingerprint representation from doorbell device 104, analyze the received fingerprint representation, and control one or more smart home devices, such as computerized lock 108 or smart speakers 322 of FIG. 3.

Fingerprint module 220 may execute locally (e.g., at processors 240) to provide functions associated with comparing a received representation of a fingerprint to stored, trusted representations of fingerprints in guest fingerprint database 226. In some examples, fingerprint module 220 may act as an interface to a remote service accessible to server device 210. For example, fingerprint module 220 may be an interface or application programming interface (API) to a remote server that compares a received representation of a fingerprint to stored, trusted representations of fingerprints in guest fingerprint database 226.

In some examples, communication module 222 may execute locally (e.g., at processors 240) to provide functions associated with receiving fingerprint representations and sending operational commands to smart home devices. In some examples, communication module 222 may act as an interface to a remote service accessible to server device 210. For example, communication module 222 may be an interface or application programming interface (API) to a remote server that receives fingerprint representations and sends operational commands to smart home devices.

One or more storage components 248 within server device 210 may store information for processing during operation of server device 210 (e.g., server device 210 may store data accessed by modules 220 and 222 during execution at server device 210). In some examples, storage component 248 is a temporary memory, meaning that a primary purpose of storage component 248 is not long-term storage. Storage components 248 on server device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222, and guest fingerprint database 226. Storage components 248 may include a memory configured to store data or other information associated with modules 220 and 222, and guest fingerprint database 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of server device 210 may communicate with external devices via one or more wired and/or wireless networks by transmitting and/or receiving network signals on one or more networks. Examples of communication units 242 include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units 242 may include short wave radios, cellular data radios, wireless network radios, as well as universal serial bus (USB) controllers.

One or more input components 244 of server device 210 may receive input. Examples of input are tactile, audio, and video input. Input components 244 of server device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras) one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of server device 210 may generate output in a selected modality. Examples of modalities may include a tactile notification, audible notification, visual notification, machine generated voice notification, or other modalities. Output components 246 of server device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of server device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of server device 210, UIC 212 may also represent an external component that shares a data path with server device 210 for transmitting and/or receiving input and output. For instance, in one example, UIC 212 represents a built-in component of server device 210 located within and physically connected to the external packaging of server device 210 (e.g., a screen on a mobile phone). In another example, UIC 212 represents an external component of server device 210 located outside and physically separated from the packaging or housing of server device 210 (e.g., a monitor, a projector, etc. that shares a wired and/or wireless data path with server device 210).

UIC 212 of server device 210 may detect two-dimensional and/or three-dimensional gestures as input from a user of server device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

Server device 210 may be included in system 102 of FIG. 1, such as by replacing or supplementing server device 110. As such, additional reference to certain elements of FIG. 1 will follow as they would interact with a device such as server device 210, although server device 210 may also interact with additional devices not shown in FIG. 1.

In accordance with the techniques described herein, a doorbell device, such as doorbell device 104, may detect, using a fingerprint sensor, such as fingerprint sensor 106, a touch input from a first digit of a first guest. Fingerprint sensor 106 may capture a representation of a fingerprint of the first digit of the first guest.

In some instances, fingerprint sensor 106 may comprise an optical fingerprint sensor. When capturing the representation of the fingerprint of the first digit, fingerprint sensor 106 may, in response to detecting the touch input of the first digit, capture a digital image of the fingerprint of the first digit of the first guest.

In other instances, fingerprint sensor 106 may be a capacitive fingerprint sensor. When capturing the representation of the fingerprint of the first digit, fingerprint sensor 106 may create an electrostatic field near a conductive plate on doorbell device 104. In response to detecting the touch input of the first digit at the conductive plate, fingerprint sensor 106 or doorbell device 104 may measure a change in the electrostatic field resulting from the touch input. Doorbell device 104 or fingerprint sensor 106 may then create a digital image based on the change in the electrostatic field resulting from the touch input, where the representation of the fingerprint of the first digit is the digital image.

In response to capturing the representation of the fingerprint of the first digit, doorbell device 104 may transmit the representation of the fingerprint of the first digit to server device 210. Server device 210 may receive the representation of the fingerprint using communication module 222 and communication units 242.

In response to receiving the representation of the fingerprint of the first digit, fingerprint module 220 may compare the representation of the fingerprint of the first digit to one or more entries of guest fingerprint database 226 for a first user. A profile of the first user includes an association with doorbell device 104, such as by indicating that the first user owns doorbell device 104 or is an authorized user to control doorbell device 104. Entries of guest fingerprint database 226 may include any one or more of a representation of an accepted fingerprint for each trusted guest (including the first guest), an identifier for each trusted guest (e.g., a name or a relation), and a set of one or more operational commands defined for each particular guest that server device 210 will send to each corresponding smart home device. In response to determining that the representation of the fingerprint of the first digit substantially matches a first entry of guest fingerprint database 226 for the first user, communication module 222 may send an operational command, such as an unlock command, to a smart home device, such as a computerized locking mechanism (e.g., computerized locking mechanism 108 of FIG. 1). In some instances, communication module 222 may additionally output, to a mobile device associated with the first user, a notification that the first guest has accessed the system, such as by unlocking computerized locking mechanism 108. In response to receiving the operational command from communication module 222, the smart home device may perform an action corresponding to the operational command. For instance, computerized locking mechanism 108 may change from a locked state to an unlocked state.

Other smart home devices that communication module 222 may control include, for instance, any one or more of a thermostat, a lighting structure, a security panel, a security monitoring device, a household appliance, an entertainment device, and a wireless internet router, among other things. For instance, when the smart home device includes a thermostat, the operational command may include setting the thermostat to a particular temperature, turning on heat or air conditioning, or any other operation typically performed by a thermostat.

When smart home device includes a lighting structure, the operational command may include turning on a light or set of lights, turning off a light or set of lights, turning on a ceiling fan, setting a brightness level of a light, or any other operation typically performed by a lighting structure.

When smart home device includes a security panel, the operational command may include turning off a home security system or any other operation typically performed by a security panel.

When smart home device includes a security monitoring device, such as a camera device, a motion sensor, or a contact sensor the operational command may include activating the security monitoring device, deactivating the security monitoring device, or any other operation typically performed by a security monitoring device.

When smart home device includes a household appliance, such as a washing machine, a dishwasher, a coffee maker, a robotic vacuum cleaner, or any other typical household appliance that connects to a network, the operational command may include turning on or off any operation typically performed by a household appliance.

When smart home device includes an entertainment device, such as a smart speaker, a television set, a cable box, a gaming console, or a streaming box, the operational command may include turning the entertainment device on or off, setting the entertainment device to a particular channel or streaming application, turning on a particular program or music playlist, or any other operation typically performed by an entertainment device.

When smart home device includes a wireless internet router, the operational command may include turning on a wireless broadcast, turning off a wireless broadcast, turning on a guest network, or any other operation typically performed by a wireless internet router.

In some instances, the first entry for guest fingerprint database 226 may further include a personalized tone for the first guest. Rather than playing a typical or default doorbell chime, communication module 222 may instead output, for playback at one or more audio output devices in or around the home, the personalized tone.

Server device 210 may operate in a different manner in other circumstances, such as when the corresponding entry in guest fingerprint database 226 contains different operational commands or is not present at all in guest fingerprint database 226. For instance, when the second guest is not in guest fingerprint database 226, fingerprint sensor 106 may detect a touch input from a second digit of a second guest different than the first guest and capture a representation of a fingerprint of the second digit. In response to capturing the representation of the fingerprint of the second digit, doorbell device 104 may transmit the representation of the fingerprint of the second digit to server device 210 and communication module 222. In response to receiving the representation of the fingerprint of the second digit at communication module 222, fingerprint module 220 may compare the representation of the fingerprint of the second digit to the one or more entries of guest fingerprint database 226 for the first user. In response to fingerprint module 220 determining that the representation of the fingerprint of the second digit does not substantially match any of the one or more entries of guest fingerprint database 226 for the first user, communication module 220 may send a camera activation command to doorbell device 104. Doorbell device 104 may, in response to receiving the camera activation command from communication module 220, activate a camera operatively connected to doorbell device 104.

In another instance, the operational command itself may restrict access for the guest. In such instances, fingerprint sensor 106 may detect a touch input from a second digit of a second guest different than the first guest and capture a representation of a fingerprint of the second digit. In response to capturing the representation of the fingerprint of the second digit, doorbell device 104 may transmit the representation of the fingerprint of the second digit to server device 210 and communication module 222. In response to receiving the representation of the fingerprint of the second digit at communication module 222, fingerprint module 220 may compare the representation of the fingerprint of the second digit to the one or more entries of guest fingerprint database 226 for the first user. In response to fingerprint module 220 determining that the representation of the fingerprint of the second digit substantially matches a second entry of guest fingerprint database 226 for the first user, fingerprint module 220 may determine that the second entry includes a second set of one or more commands that includes sending a camera activation command to the doorbell device. Communication module 222 may send the camera activation command to doorbell device 104, which may, in response to receiving the camera activation command from communication module 222, activate a camera operatively connected to doorbell device 104. In this instance, computerized locking mechanism 108 may remain in the locked state, even after doorbell device 104 activates the camera. This may be because the user does not wish to provide that particular guest with access to their home.

In a similar scenario with an unwanted guest, while computerized locking mechanism 108 is in the locked state, computerized locking mechanism 108 may include motion, contact, or pressure sensors that detect that a second guest is attempting to open a door controlled by computerized locking mechanism 108. In response to detecting that the second guest is attempting to open the door controlled by computerized locking mechanism 108 while it is in the locked state, computerized locking mechanism 108 may send an indication of an unexpected entry attempt to server device 210 and communication module 222. In such instances, communication module 222 may, in response to receiving the indication of the unexpected entry attempt, output, to a mobile device associated with the first user, an alert warning the user of the unexpected entry attempt.

In still some instance, the second guest may be a new acquaintance or contact that the user wishes to add to guest fingerprint database 226. In such instances, fingerprint sensor 106 may detect a touch input from a second digit of a second guest different than the first guest and capture a representation of a fingerprint of the second digit. In response to capturing the representation of the fingerprint of the second digit, doorbell device 104 may transmit the representation of the fingerprint of the second digit to server device 210 and communication module 222. In response to receiving the representation of the fingerprint of the second digit at communication module 222, fingerprint module 220 may compare the representation of the fingerprint of the second digit to the one or more entries of guest fingerprint database 226 for the first user. In response to fingerprint module 220 determining that the representation of the fingerprint of the second digit does not substantially match any of the one or more entries of guest fingerprint database 226 for the first user, communication module 220 may issue a prompt to a mobile device associated with the first user to add an entry to guest fingerprint database 226. The new entry may then include at least the representation of the fingerprint of the second digit received by communication module 220 and a set of one or more operational commands for the second guest.

Using the techniques described herein, a homeowner or trusted user of a smart home ecosystem can securely and simply grant immediate and limited access to a variety of smart home devices in a manner explicitly customized by the trusted user. With trusted guests, such as family members or close friends, the user can adjust various devices within the home to operate in accordance with the trusted guests' preferred manner, providing quick and consistent comfort and efficiency to those trusted users whenever they wish to enter the home. With less casual guests who require access to the home, such as cleaning crews or dogwalkers, the user can customize the setup to unlock the door, potentially turn on preferred playlists of music for when they are conducting business with the home, and possibly turning on security cameras within the home to monitor their presence.

Furthermore, when the user wishes for that guest to no longer have that access, the user can remove or edit the entry for that guest without disrupting every other user and/or guest who accesses the home. For instance, if the user's dogwalker finds different employment and the user needs to find a new dogwalker, the user can revoke access from the previous dogwalker and add access to the new dogwalker, editing only their experience without requiring security changes to every other guest. Furthermore, the separation of processes between the doorbell, the server, and the smart home device creates added stability, security, and consistency with the more trusted infrastructure over the network which those devices communicate.

Figure 3:
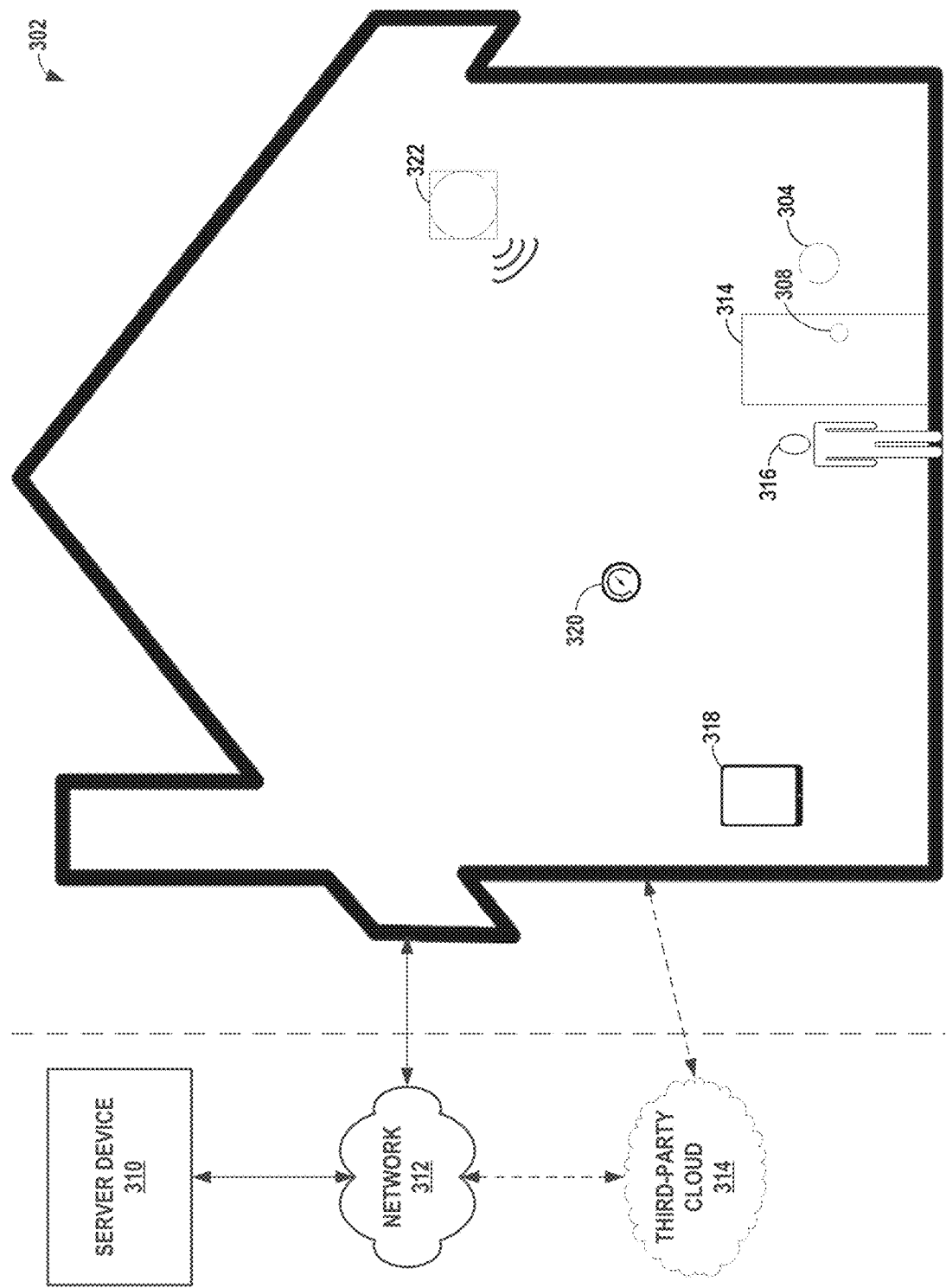
FIG. 3 is a conceptual diagram illustrating a guest accessing a smart home ecosystem using a fingerprint sensor on a doorbell device, in accordance with the techniques described herein.

FIG. 3 is a conceptual diagram illustrating guest 316 accessing smart home ecosystem 302 using a fingerprint sensor on doorbell device 304, in accordance with the techniques described herein. Smart home ecosystem 302 may include doorbell device 304, computerized locking mechanism 308, server device 310, and network 312, which may be substantially similar to doorbell device 104, computerized locking mechanism 108, server device 110, and network 112, respectively. Smart home ecosystem 302 may also include additional smart home devices, such as security panel 318, thermostat 320, and smart speaker 322, although other examples of smart home ecosystem 302 could include additional or different devices, such as a lighting structure, a security monitoring device (e.g., motion sensors, contact sensors, or a security camera), a household appliance, an alternative entertainment device, and a wireless internet router, among other things.

Guest 316, as defined throughout this description, may be any individual programmed to have access to smart home ecosystem 302. For instance, guest 316 may be a user or owner of smart home ecosystem 302, a family member of the user or owner of smart home ecosystem 302, a friend of the user or owner of smart home ecosystem 302, an employee of the user or owner of smart home ecosystem 302, or any other acquaintance, personal, business, or otherwise, of the user or owner of smart home ecosystem 302. As such, guest 316 may be any individual attempting to access smart home ecosystem 302 or the home that contains smart home ecosystem 302. In other words, while the term "guest" is used throughout this disclosure, the term may, in addition to non-users or non-owners, refer to the user which owns or operates the smart home devices, including the user that would be notified of the attempted access.

In the example of FIG. 3, guest 316 may approach doorbell device 304. In some instances, a motion sensor or camera within doorbell device 304 may detect the motion of guest 316 as guest 316 approaches doorbell device 304. With the detected motion, a camera within doorbell device, in some instances, may activate, and a user associated with smart home ecosystem 302 (which may or may not be guest 316) may be notified of the presence of guest 316, such as through a typical notification API.

Guest 316 may place a digit on a fingerprint sensor of doorbell device 304. The fingerprint sensor, be it an optical sensor a capacitive sensor, an ultrasound sensor, or a thermal sensor, captures a representation of the fingerprint and sends the representation to server device 310 via network 312 for verification. Server device 310 may compare the representation of the fingerprint to stored, trusted representations of fingerprints for various trusted individuals. If a certain percentage of the received representation matches a stored, trusted representation, server device 310 may declare the received representation to be a match with that respective entry in the guest fingerprint database. For instance, if a minutiae-based analysis (i.e., comparing locations and directions of various points of the fingerprint, which may be sometimes referred to as "Galton Points"), a fingerprint may have anywhere between 20 and 30 minutiae, and the fingerprints may match if more than 10 minutiae are in common between the received representation and the stored representation. In a pattern matching analysis, the received representation may match the stored representation if a comparative image analysis considers the two representations to be more than a percentage similar (e.g., more than 40% similar, 50% similar, 75% similar, 90% similar, 99% similar, or any other reasonable threshold).

If server device 310 finds a match for the received fingerprint representation, server device 310 may further refer to that corresponding entry of the matched representation to determine which actions have been defined for that particular individual. In some instances, this could be unlocking computerized locking mechanism 308. In other instances, computerized locking mechanism 308 may remain locked, and a user/owner of smart home ecosystem 302 may be notified of their presence and prompted to start a video chat with guest 316. In still other instances, additional operational commands may be stored in guest fingerprint database for controlling other smart home devices, such as starting to stream a playlist of music over smart speaker 322, or adjusting thermostat 320 to control an HVAC system to a particular temperature.

If server device 310 does not find a match for the received fingerprint representation, server device 310 may perform a variety of actions. In some instances, server device 310 may send doorbell device 304 a command to activate a camera in doorbell device and send a notification to a mobile device associated with the user to notify the user of the presence of guest 316 and their lack of a trusted status. In other instances, server device 310 may send a prompt to the mobile device associated with the user to add guest 316 and their captured fingerprint representation to the guest fingerprint database, along with a set of one or more operational commands to perform when server device 310 verifies the identity of guest 316 at the home.

After verifying the identity of guest 316, server device 310 may send the operational commands stored along with the guest database entry to the corresponding smart home devices. In some instances, if those smart home devices are manufactured by a third-party that is different than the manufacturer or brand of doorbell device 304 and server device 310, the third-party may require that remote commands sent to those devices go through third-party cloud 314. While other third-party manufacturers may allow direct communication over network 312, if the third-party does require communication through third-party cloud 314, server device 310 may send the operational command to third-party cloud 314 via network 312. Third-party cloud 314 may then forward the operational command to the corresponding smart home device. In other instances, server device 310 may send the operational command directly to the corresponding smart home device via network 312.

In one example, server device 310 may identify guest 316 as a dogwalker for the user. As such, server device 310 may send an unlock command to computerized lock mechanism 308, enabling guest 316 to open door 314 and enter the home. Server device 310 may also send an operational command to an entryway light to turn on so that guest 316 may retrieve the dog located inside of the home and take them for the walk.

In another example, server device 310 may identify guest 316 as a member of a cleaning crew who comes weekly to clean the user's home. As such, server device 310 may send an unlock command to computerized lock mechanism 308, enabling guest 316 to open door 314 and enter the home. Server device 310 may also send an operational command to all of the lights on the entry level of the home to turn on, and may set smart speaker 322 to a particular playlist that the user knows the cleaning crew member enjoys listening to while they clean the user's home, while also sending a command to a security camera inside the home to begin monitoring the cleaning crew member's actions in the home.

In yet another example, server device 310 may identify guest 316 as the user's girlfriend. As such, server device 310 may send an unlock command to computerized lock mechanism 308, enabling guest 316 to open door 314 and enter the home. Server device 310 may also send an operational command to thermostat 320 to turn on the heat to 70 degrees Fahrenheit, an operational command to security panel 318 to turn off the home security system, and an operational command to a television set to turn on and be set to guest 316's favorite streaming application. This entry for guest 316 may also include a personalized doorbell tone for guest 316, such as playing a romantic ballad or a smooth jazz ditty in lieu of a typical or default doorbell chime. As such, server device 310 may further output the personalized tone at an audio output device attached to doorbell device 304 in response to validating the identity of guest 316.

In yet another example, server device 310 may identify guest 316 as the user him or herself. The user may set up a profile for themselves in the guest fingerprint database so that smart home ecosystem 302 is set to their preferences upon returning home from work or a personal excursion. For instance, server device 310 may send an unlock command to computerized lock mechanism 308 to unlock. Server device 310 may also send an operational command to thermostat 320 to turn on the air conditioning to 64 degrees Fahrenheit, an operational command to security panel 318 to turn off the home security system, an operational command to the living room light to turn on to 50% intensity, and an operational command to a connected coffee pot to begin brewing a cup of coffee.

Figure 4:
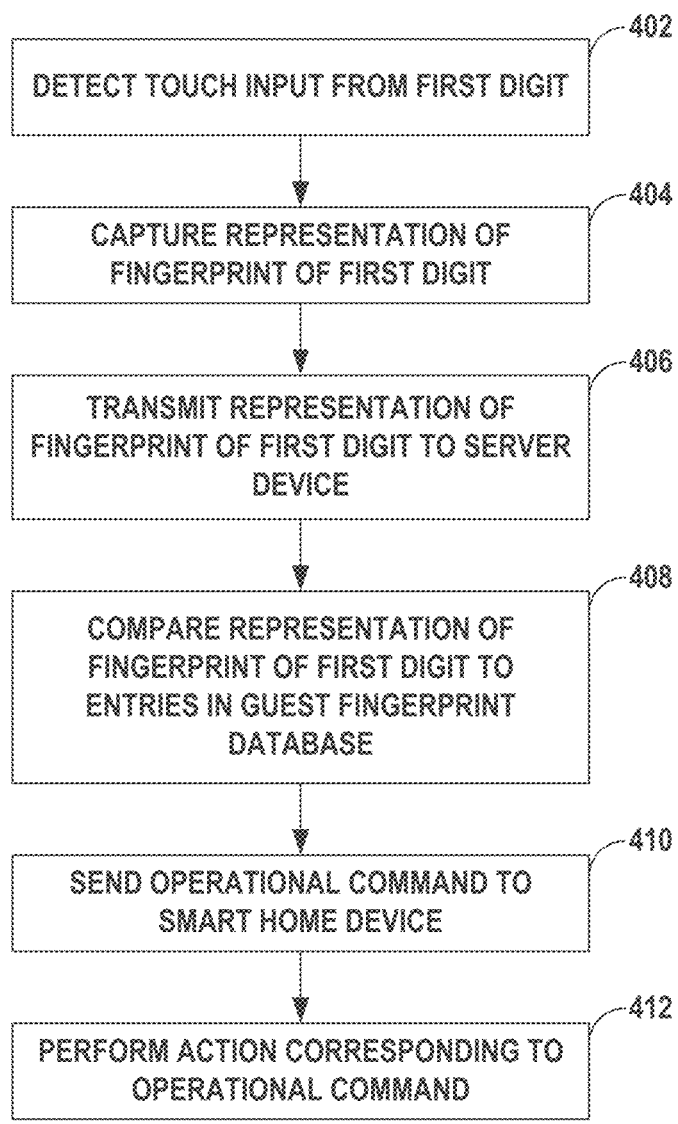
FIG. 4 is a flow diagram chart illustrating an example method for verifying a guest using a fingerprint sensor on a doorbell device in order to control one or more smart home devices, in accordance with the techniques described herein.

FIG. 4 is a flow diagram chart illustrating an example method for verifying a guest using a fingerprint sensor on a doorbell device in order to control one or more smart home devices, in accordance with the techniques described herein. The techniques of FIG. 4 may be performed by one or more processors of a computing device, such as system 102 of FIG. 1 and/or server device 210 illustrated in FIG. 2. For purposes of illustration only, the techniques of FIG. 4 are described within the context of system 102 of FIG. 1, although computing devices having configurations different than that of system 102 (e.g., different smart home devices other than computerized locking mechanism 108) may perform the techniques of FIG. 4.

In accordance with the techniques described herein, fingerprint sensor 106 of doorbell device 104 detects a touch input from a first digit of a first guest (402). Fingerprint sensor 106 captures a representation of a fingerprint of the first digit of the first guest (404). In response to capturing the representation of the fingerprint of the first digit, doorbell device 104 transmits the representation of the fingerprint of the first digit to a server device (406).

In response to receiving the representation of the fingerprint of the first digit, server device 110 compares the representation of the fingerprint of the first digit to one or more entries of a guest fingerprint database for a first user (408), where a profile of the first user includes an association with the doorbell device. In response to determining that representation of the fingerprint of the first digit substantially matches a first entry of the guest fingerprint database for the first user, server device 110 sends an operational command to a smart home device (410), such as computerized locking mechanism 108, separate from the doorbell device and located at a same premises as the doorbell device. In response to receiving the operational command from the server device, the smart home device (e.g., computerized locking mechanism 108, or other devices such as security panel 318, thermostat 320, or smart speaker 322) perform an action corresponding to the operational command (412).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A system comprising:
a computerized locking mechanism in a locked state;
a server device comprising one or more processors; and
a doorbell device separate from the computerized locking mechanism, the doorbell device comprising a fingerprint sensor, and wherein the doorbell device is configured to:
 detect, using the fingerprint sensor, a touch input from a first digit of a first guest;
 capture, using the fingerprint sensor, a representation of a fingerprint of the first digit of the first guest; and
 in response to capturing the representation of the fingerprint of the first digit, transmit the representation of the fingerprint of the first digit to the server device, wherein the one or more processors of the server device are configured to:
 in response to receiving the representation of the fingerprint of the first digit, compare the representation of the fingerprint of the first digit to one or more entries of a guest fingerprint database, wherein a profile for the guest fingerprint database includes an association with the doorbell device; and
 in response to determining that the representation of the fingerprint of the first digit substantially matches a first entry of the guest fingerprint database, send an unlock command to the computerized locking mechanism, wherein the first entry for the guest fingerprint database comprises:
 a representation of an accepted fingerprint for the first guest,
 an identifier for the first guest, and
 a first set of one or more operational commands that includes sending the unlock command to the computerized locking mechanism, wherein the first set of one or more operational commands does not include sending a camera activation command to the doorbell device,
wherein the computerized locking mechanism is configured to:
 in response to receiving the unlock command from the server device, change to an unlocked state,
wherein the doorbell device is further configured to:
 detect, using the fingerprint sensor, a touch input from a second digit of a second guest different than the first guest;
 capture, using the fingerprint sensor, a representation of a fingerprint of the second digit; and
 in response to capturing the representation of the fingerprint of the second digit, transmit the representation of the fingerprint of the second digit to the server device, wherein the one or more processors of the server device are further configured to:
 in response to receiving the representation of the fingerprint of the second digit, compare the representation of the fingerprint of the second digit to the one or more entries of the guest fingerprint database;
 in response to determining that the representation of the fingerprint of the second digit substantially matches a second entry of the guest fingerprint database, determining that the second entry includes a second set of one or more commands that includes sending a camera activation command to the doorbell device; and send the camera activation command to the doorbell device, and wherein the doorbell device is further configured to:

in response to receiving the camera activation command from the server device, activate a camera operatively connected to the doorbell device.

2. The system of claim 1, wherein the system further comprises a smart home device separate from each of the doorbell device and the computerized locking mechanism, and wherein the one or more processors of the server device are further configured to:

in response to determining that the representation of the fingerprint of the first digit substantially matches the first entry of the guest fingerprint database, send an operational command to the smart home device, wherein the smart home device is configured to:

in response to receiving the operational command from the server device, perform an action corresponding to the operational command.

3. The system of claim 2, wherein the smart home device comprises one of a thermostat, a lighting structure, a security panel, a security monitoring device, a household appliance, an entertainment device, and a wireless internet router.

4. The system of claim 1, wherein the fingerprint sensor comprises an optical fingerprint sensor, and wherein the doorbell device being configured to capture the representation of the fingerprint of the first digit comprises the doorbell device being configured to:

in response to detecting the touch input of the first digit, capture, using the optical fingerprint sensor, a digital image of the fingerprint of the first digit of the first guest.

5. The system of claim 1, wherein the fingerprint sensor comprises a capacitive fingerprint sensor, and wherein the doorbell device being configured to capture the representation of the fingerprint of the first digit comprises the doorbell device being configured to:

create, using the capacitive fingerprint sensor, an electrostatic field near a conductive plate on the doorbell device;

in response to detecting the touch input of the first digit at the conductive plate, measure a change in the electrostatic field resulting from the touch input; and create a digital image based on the change in the electrostatic field resulting from the touch input, wherein the representation of the fingerprint of the first digit comprises the digital image.

6. The system of claim 1, wherein the doorbell device is further configured to:

detect, using the fingerprint sensor, a touch input from a second digit of a second guest different than the first guest;

capture, using the fingerprint sensor, a representation of a fingerprint of the second digit; and in response to capturing the representation of the fingerprint of the second digit, transmit the representation of the fingerprint of the second digit to the server device, wherein the one or more processors of the server device are further configured to:

in response to receiving the representation of the fingerprint of the second digit, compare the representation of the fingerprint of the second digit to the one or more entries of the guest fingerprint database; and in response to determining that the representation of the fingerprint of the second digit does not substantially match any of the one or more entries of the guest fingerprint database, send a camera activation command to the doorbell device, wherein the doorbell device is further configured to:

in response to receiving the camera activation command from the server device, activate a camera operatively connected to the doorbell device.

7. The system of claim 1, wherein the computerized locking mechanism remains in the locked state after the doorbell device activates the camera.

8. The system of claim 1, wherein the one or more processors of the server device are further configured to:

output, to a mobile device associated with the profile, a notification that the first guest has unlocked the computerized locking mechanism.

9. The system of claim 1, wherein the first entry for the guest fingerprint database comprises a personalized tone for the first guest, wherein the one or more processors of the server device are further configured to:

output, for playback at one or more audio output devices, the personalized tone.

10. The system of claim 1, wherein the computerized locking mechanism is further configured to:

while the computerized locking mechanism is in the locked state, detect that a second guest is attempting to open a door controlled by the computerized locking mechanism; and in response to detecting that the second guest is attempting to open the door controlled by the computerized locking mechanism, send an indication of an unexpected entry attempt to the server device, wherein the one or more processors of the server device are further configured to:

in response to receiving the indication of the unexpected entry attempt, output, to a mobile device associated with the profile, an alert.

11. The system of claim 1, wherein the doorbell device is further configured to:

detect, using the fingerprint sensor, a touch input from a second digit of a second guest different than the first guest;

capture, using the fingerprint sensor, a representation of a fingerprint of the second digit; and in response to capturing the representation of the fingerprint of the second digit, transmit the representation of the fingerprint of the second digit to the server device, wherein the one or more processors of the server device are further configured to:

in response to receiving the representation of the fingerprint of the second digit, compare the representation of the fingerprint of the second digit to the one or more entries of the guest fingerprint database; and in response to determining that the representation of the fingerprint of the second digit does not substantially match any of the one or more entries of the guest fingerprint database, issue a prompt to a mobile device associated with the profile to add a second entry to the guest fingerprint database, the second entry including at least the representation of the fingerprint of the second digit and a set of one or more operational commands for the second guest.

12. A method comprising:
   detecting, by fingerprint sensor of a doorbell device, a touch input from a first digit of a first guest;
   capturing, by the fingerprint sensor, a representation of a fingerprint of the first digit of the first guest;
   in response to capturing the representation of the fingerprint of the first digit, transmitting, by the doorbell device, the representation of the fingerprint of the first digit to a server device;
   in response to receiving the representation of the fingerprint of the first digit, comparing, by the server device, the representation of the fingerprint of the first digit to one or more entries of a guest fingerprint database, wherein a profile for the guest fingerprint database includes an association with the doorbell device;
   in response to determining that representation of the fingerprint of the first digit substantially matches a first entry of the guest fingerprint database, sending an operational command to a smart home device separate from the doorbell device and located at a same premises as the doorbell device, wherein the first entry for the guest fingerprint database comprises:
      a representation of an accepted fingerprint for the first guest,
      an identifier for the first guest, and
      a first set of one or more operational commands that includes sending the operational command to the smart home device, wherein the first set of one or more operational commands does not include sending a camera activation command to the doorbell device;
   in response to receiving the operational command from the server device, performing, by the smart home device, an action corresponding to the operational command;
   detecting, by the fingerprint sensor, a touch input from a second digit of a second guest different than the first guest;
   capturing, by the fingerprint sensor, a representation of a fingerprint of the second digit; and
   in response to capturing the representation of the fingerprint of the second digit, transmitting, by the doorbell device, the representation of the fingerprint of the second digit to the server device,
   in response to receiving the representation of the fingerprint of the second digit, comparing, by the server device, the representation of the fingerprint of the second digit to the one or more entries of the guest fingerprint database;
   in response to determining that the representation of the fingerprint of the second digit substantially matches a second entry of the guest fingerprint database, determining, by the server device, that the second entry includes a second set of one or more commands that includes sending a camera activation command to the doorbell device;
   sending, by the server device, the camera activation command to the doorbell device, and
   in response to receiving the camera activation command from the server device, activating, by the doorbell device, a camera operatively connected to the doorbell device.

13. The method of claim 12, wherein the smart home device comprises one of a thermostat, a lighting structure, a security panel, a security monitoring device, a household appliance, an entertainment device, a wireless internet router, and a computerized lock.

14. The method of claim 12, further comprising:
   outputting, by the server device, and to a mobile device associated with the profile, a notification that the first guest has accessed the smart home device.

15. The method of claim 12, further comprising:
   detecting, using the fingerprint sensor of the doorbell device, a touch input from a second digit of a second guest different than the first guest;
   capturing, using the fingerprint sensor of the doorbell device, a representation of a fingerprint of the second digit;
   in response to capturing the representation of the fingerprint of the second digit, transmitting, by the doorbell device, the representation of the fingerprint of the second digit to the server device;
   in response to receiving the representation of the fingerprint of the second digit, comparing, by the server device, the representation of the fingerprint of the second digit to the one or more entries of the guest fingerprint database; and
   in response to determining that the representation of the fingerprint of the second digit does not substantially match any of the one or more entries of the guest fingerprint database, issuing, by the server device, a prompt to a mobile device associated with the profile to add a second entry to the guest fingerprint database, the second entry including at least the representation of the fingerprint of the second digit and a set of one or more operational commands for the second guest.

16. A non-transitory computer-readable storage medium comprising instructions that, when executed by one or more processors of a server device, cause the one or more processors to:
   receive, from a doorbell device comprising a fingerprint sensor, a representation of a fingerprint of a first digit of a first guest;
   in response to receiving the representation of the fingerprint of the first digit, compare the representation of the fingerprint of the first digit to one or more entries of a guest fingerprint database, wherein a profile for the guest fingerprint database includes an association with the doorbell device;
   in response to determining that representation of the fingerprint of the first digit substantially matches a first entry of the guest fingerprint database, send an unlock command to a computerized locking mechanism, wherein the first entry for the guest fingerprint database comprises:
      a representation of an accepted fingerprint for the first guest,
      an identifier for the first guest, and
      a first set of one or more operational commands that includes sending the unlock command to the computerized locking mechanism, wherein the first set of one or more operational commands does not include sending a camera activation command to the doorbell device;
   receive, from the doorbell device, a representation of a fingerprint of a second digit of a second guest;
   in response to receiving the representation of the fingerprint of the second digit, compare the representation of the fingerprint of the second digit to the one or more entries of the guest fingerprint database;
   in response to determining that the representation of the fingerprint of the second digit substantially matches a second entry of the guest fingerprint database, determining, by the server device, that the second entry includes a second set of one or more commands that includes sending a camera activation command to the doorbell device;

sending, by the server device, the camera activation command to the doorbell device.

\* \* \* \* \*